United States Patent [19]

Hanada et al.

[11] Patent Number: 5,178,704
[45] Date of Patent: Jan. 12, 1993

[54] SPIRALLY WINDING A BELT REINFORCING LAYER FOR A PNEUMATIC RADIAL TIRE AT A HIGHER DENSITY BENEATH THE GROOVE AREAS

[75] Inventors: Ryoji Hanada; Seiichi Hirayama, both of Hiratsuka; Katsuhide Kawaguchi, Numazu, all of Japan

[73] Assignee: The Yokohama Rubber Co., Ltd., Tokyo, Japan

[21] Appl. No.: 469,467

[22] PCT Filed: Jul. 28, 1989

[86] PCT No.: PCT/JP89/00780
§ 371 Date: Mar. 27, 1990
§ 102(e) Date: Mar. 27, 1990

[87] PCT Pub. No.: WO90/01426
PCT Pub. Date: Feb. 22, 1990

[30] Foreign Application Priority Data

Jul. 29, 1988 [JP] Japan ................. 63-188294

[51] Int. Cl.⁵ ............................... B29D 30/08
[52] U.S. Cl. .................... 156/117; 152/531; 152/533; 156/130
[58] Field of Search ........... 152/526, 527, 531, 533, 152/209 R, 209 B; 156/117, 123, 124, 130, 397

[56] References Cited

U.S. PATENT DOCUMENTS

| | | | |
|---|---|---|---|
| 4,308,083 | 12/1981 | Toth, Jr. | 156/123 X |
| 4,824,501 | 4/1989 | Ushikubo et al. | 156/130 |

FOREIGN PATENT DOCUMENTS

| | | | |
|---|---|---|---|
| 57503 | 6/1974 | Japan . | |
| 140105 | 11/1977 | Japan . | |
| 1159040 | 8/1985 | Japan | 152/209 B |
| 203803 | 9/1987 | Japan | 156/117 |
| 225406 | 10/1987 | Japan . | |
| 246804 | 10/1990 | Japan | 152/526 |

*Primary Examiner*—Geoffrey L. Knable
*Attorney, Agent, or Firm*—Nikaido, Marmelstein, Murray & Oram

[57] ABSTRACT

A pneumatic radial tire including a belt reinforcing layer or layers formed by spirally continuously winding a single organic fiber cord in a manner such that before the molding of an unvulcanized tire, the belt reinforcing layer or an outer or outermost belt reinforcing layer has a greater density of winding of the organic fiber cord in its regions located beneath or inner to a main groove-forming rib of a mold than in its remaining region, whereby after the molding of the unvulcanized tire, the cord density in the regions of the belt reinforcing layer or the outer or outermost belt reinforcing layer beneath or inner to the main groove-forming rib is set to be substantially identical with the cord density in its remaining region; and a process for the production of such tire.

5 Claims, 2 Drawing Sheets

SPIRALLY WINDING A BELT REINFORCING LAYER FOR A PNEUMATIC RADIAL TIRE AT A HIGHER DENSITY BENEATH THE GROOVE AREAS

FIELD OF ART

The present invention relates to a pneumatic radial tire which has an improved belt reinforcing structure and can thereby exhibit an improved high speed durability. The invention also relates to a process for the production of such tire.

BACKGROUND ART

As widely known, when compared with bias tires, radial tires have exceeding characteristics with respect to such as the driving stability and the abrasion resistance in high speed running. On the other hand, as automobiles have been increasingly improved with respect to their output capacity and their high-speed performance, it has been increasingly strongly demanded of radial tires that their high-speed durability should be further improved.

Damages or ruptures which radial tires may undergo when they are run at a high speed are caused mainly due to the phenomenon such that both lateral edge portions of a belt layer disposed in a tire tread region undergo a rising dislocation caused by the action of centrifugal force. To provide a radial tire structure which does not permit the above rising dislocation of belt layer edges to take place, conventionally it has been a practice to cover the outer periphery of the belt layer with a belt reinforcing layer of an organic fiber cord arranged in the circumferential direction of the tire. However, when a belt reinforcing layer comprising an organic fiber cord arranged in the tire circumferential direction is wound about the outer periphery of the belt layer as above, the two ends of the belt reinforcing layer are overlapped one on the other to produce a joint (a lap portion). This lap portion makes the tire uniformity and durability worse. This problem tends to be more conspicuous particularly when tires are mounted on a high speed car or a high power car. Then, it has been proposed not to produce a stepped lap portion by forming the above-mentioned belt reinforcing layer by spirally winding a belt-type bundle of a plurality of organic fiber cords: See for example Japanese patent application Kokai publication No. 61-60303, Japanese utility model application Kokai publication No. 61-15604, Japanese patent application Kokai publication No. 62-203803 and Japanese patent application Kokai publication No. 62-251203.

However, it has been ascertained that if a belt reinforcing layer of a spirally wound-up structure as above is provided in a radial tire having a tread pattern in which a main groove is rectilinear in the circumferential direction of the tire, then an original cord arrangement in the belt reinforcing layer in which adjacent cords are equidistantly arranged tends to become disturbed in a region beneath the main groove, whereby the high-speed durability of the tire tends to be lowered. This means that the merit of the spirally wound-up belt reinforcing layer that there is no stepped lap portion therein cannot be sufficiently demonstrated. The inventors of the present invention have conducted various investigations to determine the cause of the above problem, and as a result thereof, discovered that the above generation of disturbance of an original equidistant cord arrangement in the belt reinforcing layer of a spirally wound-up structure takes place on account of that when an unvulcanized tire is formed in a mold, a tread rubber is pressed by a main groove-forming rib of the mold to generate a movement or shift of the rubber, which causes the original equidistant cord arrangement to become disturbed or lost.

In view of the above, it is a primary object of the present invention to provide a pneumatic radial tire which maintains the merit of the belt reinforcing layer of a spirally wound-up structure and yet is free of a disturbance of the cord arrangement in the belt reinforcing layer.

It is also an object of the invention to provide a process for the production of pneumatic radial tires, which permits the merit of the belt reinforcing layer of a spirally wound-up structure to be fully exhibited and yet does not permit the cord arrangement in the belt reinforcing layer to become disturbed.

DISCLOSURE OF THE INVENTION

The pneumatic radial tire that can attain the above primary object of the invention, according to the present invention, consists of a basic structure comprising a tread having on its outer surface at least two main grooves extending in the circumferential direction of the tire, at least two belt layers disposed between the tread and a carcass, and a belt reinforcing structure including at least one belt reinforcing layer comprising an organic fiber cord and provided on an outer peripheral portion in at least a shoulder region of an outer or outermost one of the two or more belt layers. In tires having the above basic structure, the tire according to the present invention is characterized in that the belt reinforcing layer constituting the belt reinforcing structure is formed by spirally continuously winding an organic fiber cord and in that the belt reinforcing layer or at least an outer or outermost belt reinforcing layer has a cord density distribution of the organic fiber cord such that the cord density (the end count of the cord per unit width) of the organic fiber cord in regions beneath the main grooves is substantially identical with the cord density of the organic fiber cord in the remaining region.

The process for the production of pneumatic radial tires that can attain the other object of the invention, according to the present invention, includes the step of forming an unvulcanized tire which comprises at least two belt layers on the outer periphery of a carcass, a belt reinforcing structure including at least one belt reinforcing layer comprising an organic fiber cord and disposed on an outer peripheral portion of at least a shoulder region of an outer or outermost one of the two or more belt layers, and an unvulcanized tread rubber disposed on an outer peripheral portion of the belt reinforcing structure; and the step of molding the unvulcanized tire by a mold having main groove-forming ribs for forming on the outer surface of the tread rubber at least two main grooves extending in the circumferential direction of the tire; and the process is characterized by forming the belt reinforcing layer by spirally continuously winding an organic fiber cord in a manner such that before the step of molding the unvulcanized tire, at least an outermost belt reinforcing has a greater density of winding of the organic fiber cord in its regions beneath the main groove-forming ribs of the mold than in its remaining region, whereby after the step of molding the unvulcanized tire, the cord density in its regions beneath the main groove-forming ribs is set to be substantially identical with the cord density in its remaining region.

BEST MODE FOR CARRYING OUT THE INVENTION

Figure 1:
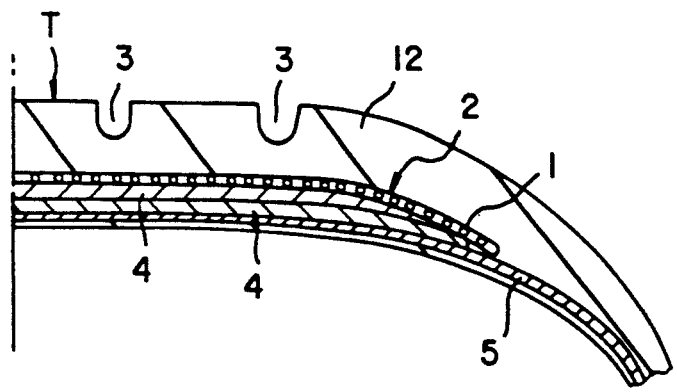
FIG. 1 is a sectional view, showing a half portion of the tread structure of a pneumatic radial tire according to an embodiment of the present invention.

In or for the present invention, pneumatic radial tires are not limited to any particular ones, and the invention can be applied to any of penumatic radial tires of conventionally generally employed tire structures. Such radial tires generally comprise a pair of a left and a right bead portions respectively connected to a sidewall portion, a tread portion connecting the two sidewall portions to each other, a carcass layer extending between the pair of bead portions virtually in the direction of a section of the tire, and at least two belt layers disposed on the outer periphery of the carcass layer in its region corresponding to the tread portion. Usually, the belt layers comprise steel cords or/and aramid fiber cords, which are arranged at a cord angle of 10° to 35° to the circumferential direction of the tire, and the cords in a belt layer are crossed with those in another belt layer.

In the radial tires according to the present invention, which have a general structure as described above, an outer or outermost one of the belt layers is covered, in at least an edge portion at respective shoulder portions of the tire, with a belt reinforcing structure comprising wound-up runs of an organic fiber cord arranged in the circumferential direction of the tire, and by this, it is prevented from occurring that belt layer edges undergo a rising dislocation during a high-speed running of the tire. The belt reinforcing structure may be provided only in the shoulder portions of the belt layer or alternatively it may be so provided as to cover a whole width portion of the belt layer, or further alternatively it may be made to provide, in combination, a belt reinforcing layer covering the shoulder edge portion of the belt layer and another belt reinforcing layer covering a whole width portion of the belt layer. However, in any of the above alternatives of the structuring, it is required to meet that at least the belt reinforcing layer coming under the outermost layer in the belt reinforcing structure is formed by a single organic fiber cord which is spirally continuously wound up in the circumferential direction of the tire. For the organic fiber cord, preferably the use is made of any of such as nylon cords, polyester cords and so forth.

Also, on the surface of the tread portion of the radial tire according to the present invention, at least two main grooves are provided, which extend in the tire circumferential direction. That the main grooves extend in the tire circumferential direction basically means that the main grooves comprise a substantially rectilinear groove, but it is not always necessary that they are rectilinear over the whole circumference of the tire and it does not matter if they include a portion which does not coincide with the tire circumferential direction. Further, that the main grooves extend in the tire circumferential direction does not necessarily mean that they run strictly at 0° relative to the tire circumferential direction but means that they take an angle of substantially 0° relative to the tire circumferential direction.

FIG. 1 shows the structure of the tread portion of a radial tire after vulcanization molding, embodying the present invention.

In the tread portion shown at T, a carcass layer 5 is disposed as innermost layer, and on the outer periphery of this layer, two belt layers 4 are arranged, of which the cords in one layer are crossed with the cords of the other layer. Moreover, on the outer periphery of the outer one of the two belt layers 4, a belt reinforcing layer 2 is provided, covering a whole surface area of the outer belt layer 4. The belt reinforcing layer 2 is formed by a single orgnic fiber cord, which is spirally continuously wound up in a virtually constant pitch of winding. Further, outer to the belt reinforcing layer 2, a tread rubber 12 is provided, on the surface of which rectilinear main grooves 3 extending in the tire circumferential direction are formed in a total number of four, two at each side of a tread center.

Figure 2:
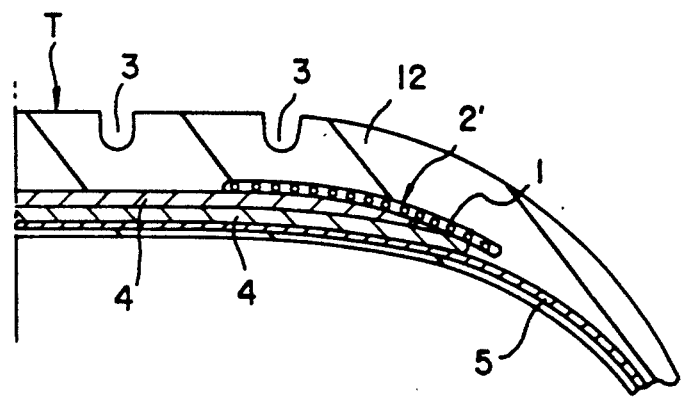
FIG. 2 is a sectional view, showing a half portion of the tread structure of a pneumatic radial tire according to another embodiment of the present invention.
Figure 3:
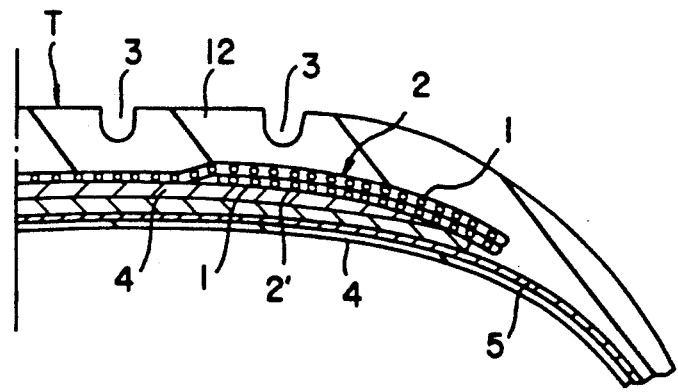
FIG. 3 is a sectional view, showing a half portion of the tread structure of a pneumatic radial tire according to a still another embodiment of the present invention.

The belt reinforcing structure of a spirally woundup structure may comprise a belt reinforcing layer which partly covers only a shoulder region of the belt layer 4 according to the embodiment of the invention shown in FIG. 2. Alternatively, as according to the other embodiment of the invention shown in FIG. 3, it may comprise a combination together of a belt reinforcing layer 2 covering a whole surface area of the belt layer 4 and a belt reinforcing layer 2' only covering a shoulder region of the belt layer 4. In each of the above belt reinforcing structures, it is set that in its region corresponding to the location of main grooves 2 beneath thereof or radially inner thereto, the belt reinforcing layer or an outer or outermost belt reinforcing layer has a cord density (end count of the cord per unit width) of 90 to 110% of the cord density in its remaining region.

To build radial tires as described above, it is necessary to meet that in providing a belt reinforcing structure of an unvulcanized tire by winding-up an organic fiber cord, the winding density of the cord is set to be larger in the region corresponding to the location of a main groove-forming rib of a mold than in the remaining region. More preferably, the cord winding density in the region corresponding in location to the main groove-forming rib is to be set within a range of 115 to 135% of the cord winding density in the remaining region. It is proposed that the cord winding density in the region corresponding to the main groove-forming rib is set to be relatively large as above, so that as the main groove-forming rib is pressed into a tread rubber at the time of vulcanization molding of a tire being built and as the tread rubber is thereby caused to move, the relatively densely arranged runs of the organic fiber cord located in the vicinity of the main groove-forming rib are moved to lower an original high cord density, whereby it is possible to attain an almost uniform distribution of densities of the runs of the organic fiber cord as a whole in the belt reinforcing layer.

Figure 4A:
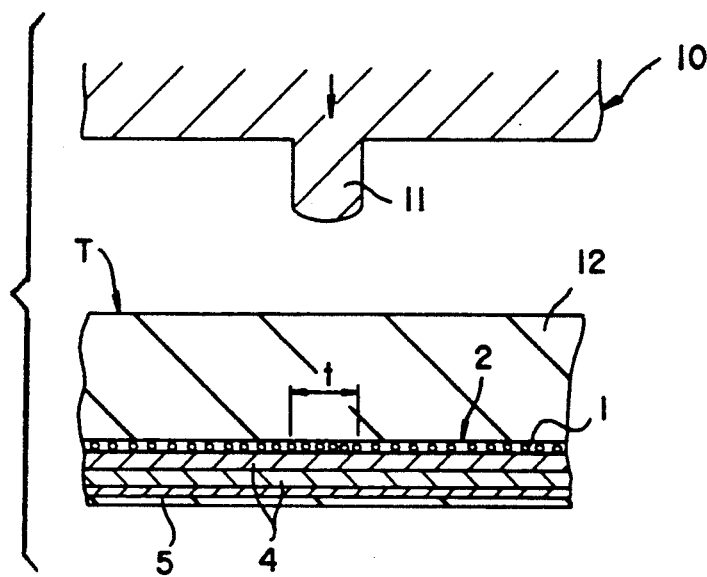
FIG. 4A shows a sectional view of a portion of a tire tread, taken for illustration of an operation condition before a tire molding step is operated in the carrying out of the process for the production of pneumatic radial tires according to the invention.
Figure 4B:
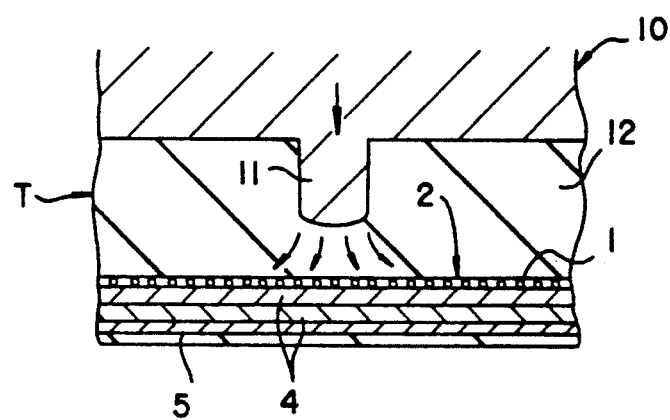
FIG. 4B shows a sectional view of a portion of the tire tread, taken for illustration of an operation condition subsequent to the operation condition shown in FIG. 4A, in which a tire molding step is now processed.
Figure 4C:
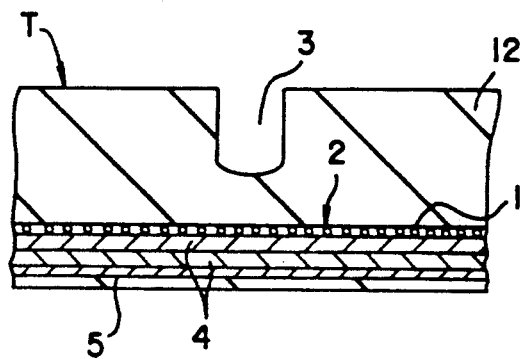
FIG. 4C shows a sectional view of a portion of the tire tread, taken for illustration of an operation condition subsequent to the operation condition shown in FIG. 4B, in which a tire molding step is now completed.

FIGS. 4A, 4B and 4C in combination show the above described tire molding steps, schematically, and in these drawing figures, the numeral 10 denotes a mold, the numeral 11 denoting a main groove-forming rib. Initially as shown in FIG. 4A, in the tread portion T of an unvulcanized tire, the belt reinforcing layer 2 disposed on the belt layer 4 is made having a larger cord winding density of the organic fiber cord 1 in the region t corresponding to the location at which the main groove-forming rib 11 is pressed into the tread rubber 12 than in the remaining region. Then, as shown in FIG. 4B, the mold 10 may be pressed as shown by a large arrow increasingly deeply into the tread portion T of the unvulcanized tire in which the cord density is set as described above, when the tread rubber 12 is caused to move as shown by small arrows, whereby the relatively densely arranged runs of the organic fiber cord 1 are moved to scatter in lateral directions in FIG. 4B. As a result of the above, once the mold 10 is removed after the vulcanization molding of the tire, the density of the wound-up runs of the organic fiber cord 1 can be substantially constant over the region beneath the main groove 3 and the remaining region.

In the above described production of radial tires, it may be made to form the belt reinforcing layer of a spirally wound-up structure by a single organic fiber cord, when it is possible to freely adjust the cord density. Contrary to this, if a plurality of belt-like bundles of an organic fiber cord is spirally wound up to form a belt reinforcing layer as in the prior art, it is impossible to freely adjust the distance between adjacent cords, so that the cord density cannot be adjusted as desired.

Also, in the above case in which the belt reinforcing layer comprises a a spirally wound-up belt-like bundle comprising a plurality of organic fiber cords, even although a rubber may relatively easily flow between adjacent bundles of the organic fiber cord, it cannot easily flow between adjacent fiber cords in respective bundles. Therefore, when the main groove-forming rib is pressed into the tread rubber to cause the rubber to flow at thw time of the vulcanization molding, the rubber cannot uniformly flow between adjacent organic fiber cords, and instead thereof, a large amount of the rubber tends to flow only between adjacent bundles of the organic fiber cord, so that an originally set equidistant arrangement of the cords is likely to undergo disturbance. Particularly, when the main groove-forming rib is a rectilinear one, it overlaps the rectilinear extension of a gap between adjacent bundles of the organic fiber cord for a relatively long distance, so that the disturbance of the cord arrangement tends to be more likely.

As described before, according to the present invention, the belt reinforcing layer of a spirally wound-up structure does not undergo a disturbance of the cord arrangement at the time of the vulcanization molding, and it is possible to obtain a substantially uniform distribution of cord densities over a whole of the belt reinforcing layer. Thus, while the advantageous characteristic of belt reinforcing layers of a spirally wound-up structure which does not involve a step-forming joined portion can be fully exhibited, it is possible to bring about a further enhancement of the high-speed durability of radial tires. Examples:

There were built four radial tires having the below described different structural specifications, namely tires A and B according to the present invention and comparative tires C and D.

Each of the tires had a tire size of 195/65R15, a single carcass layer comprising a polyester cord of 1500 D/2 disposed in an end count of 55 cords/50 mm and at a cord angle of substantially 90° to the tire circumferential direction, and two belt layers disposed on the outer periphery of the carcass layer and each comprising a 1×5 (0.25) steel cord disposed in an end count of 40 cords/50 mm and at a cord angle of 24° to the tire circumferential direction, with the cord angle of the cords in one belt layer crossed with that of the cords in the other belt layer. Also, on the tread surface, each tire had a tread pattern comprising four rectilinear main grooves extending in the tire circumferential direction.

Further, the tires commonly had a belt reinforcing layer covering the whole outer surface of the belt layers as shown in FIG. 1, but they had the following differences. The belt reinforcing layers in tires of the invention A and B and the comparative tire C:

In each of these tires, the belt reinforcing layer was formed by a single rubber-coated nylon cord, which was continuously spirally wound about the belt layers. The rate of the density of winding of the cord in the region beneach each main groove to the density of winding of the cord in the remaining region, before the vulcanization molding, was varied from tire to tire as shown in the below table. From the table, it will be seen that while the tires A and B of the present invention respectively had different cord densities in the regions beneath the main grooves on the one hand and in the remaining region on the other hand, the comparative tire C had a virtually uniform cord density over a whole region of the belt reinforcing layer.

After the vulcanization molding, the rate of cord density in the regions beneath the main grooves to that in the remaining region of respective tires was found to have been changed as shown also in the below table. The belt reinforcing layer in the comparative tire D:

The belt reinforcing layer was formed by a bundle of 11 nylon cords arranged in a belt-type form of a width of 10 mm, which was continuously spirally wound about the belt layers in a manner such that as also shown in the below table, the cord density in the region beneath each main groove is same that in the remaining region, before the vulcanization molding. After the vulcanization molding, the rate of cord densities underwent a change as further shown in the below table.

In connection with each of the four different radial tires built as above, a high-speed durability test was conducted according to the following test method. High-Speed Durability Test:

Tests were carried out in accordance with the extension test method of #109 high-speed performance tests of FMVSS (Federal Motor Vehicle Safety Standard) and under the conditions in which each test tire was inflated to an inflation pressure of 2.4 kg/cm², pressed under the load of 545 kg against a rotating drum having a drum diameter of 1707 mm, and run initially at a velocity of 81 km/h for two hours and, thereafter with the running velocity raised at a rate of 8 km/h at every 30 minutes from 121 km/h, kept running until the tire underwent a rupture. The running velocity value at the time of the rupture of the tire was taken as the high-speed durability. In the below table, the high-speed durability found of the respective tires is shown by an index with the high-speed durability found of the comparative tire C taken as 100.

The results of the tests are as shown in the below table, from which it is seen that each of the tires A and B according to the present invention has exceeding high-speed durability in comparison with each of the comparative tires C and D.

|  | Cord Density Rate (%) | | High-Speed Durability (index) |
| --- | --- | --- | --- |
|  | before vulcanization | after vulcanization | |
| Tire A of Invention | 120 | 95 | 109 |
| Tire B of Invention | 130 | 105 | 116 |
| Comparative Tire C | 100 | 80 | 100 |
| Comparative Tire D | 100 | 75 | 92 |

INDUSTRIAL APPLICABILITY OF THE INVENTION

The present invention described in detail above is applicable to pneumatic radial tires having a belt reinforcing layer of a spirally wound-up structure, and according to the invention, it is possible to obtain a uniform juxtapositional arrangement of cords in the belt reinforcing layer while the advantageous characteristic of the belt reinforcing layers of a spirally wound-up structure can be fully demonstrated. Also, with respect to its process aspect, the invention can enable to easily produce such pneumatic radial tires.

I claim:

1. A process for the production of a pneumatic radial tire, including the step of forming an unvulcanized tire which comprises at least two belt layers disposed on the outer periphery of a carcass, a belt reinforcing structure including at least one belt reinforcing layer comprising an organic fiber cord and disposed on an outer peripheral portion of at least a shoulder region of an outermost one of the at least two belt layers and extended at least part way across said at least two belt layers, and an unvulcanized tread rubber disposed on the outer periphery of the belt reinforcing structure; and the step of molding the unvulcanized tire by a mold having main groove-forming ribs for forming on the outer surface of the tread rubber at least two main grooves extending in the circumferential direction of the tire; wherein the belt reinforcing layer constituting the belt reinforcing structure is formed by spirally continuously winding a single organic fiber cord in a manner such that before the molding of the unvulcanized tire, the belt reinforcing layer has a greater density of winding of the organic fiber cord in its regions located inner to the main groove-forming ribs than in its remaining region, whereby after the molding of the unvulcanized tire, the cord density in its regions inner to the main groove-forming ribs is set to lie within a range of 90 to 110% of the cord density in its remaining region.

2. A process as claimed in claim 1, wherein the density of winding of the organic fiber cord in said regions located inner to the main groove-forming ribs is set to be 115 to 135% of the density of winding of the cord in said remaining region before the molding of the unvulcanized tire, and after the molding of the unvulcanized tire, the cord density in said regions inner to the main groove-forming ribs is set to be substantially identical with the cord density in said remaining region.

3. A process as claimed in claim 1, wherein the main groove-forming ribs are rectilinear in the circumferential direction of the tire.

4. A process as claimed in claim 1, wherein the belt layers comprise steel cords.

5. A process as claimed in claim 1, wherein the organic fiber cord in the belt reinforcing layer or layers comprises a nylon cord or a polyester cord.

* * * * *